United States Patent
Park et al.

(10) Patent No.: US 9,300,433 B2
(45) Date of Patent: Mar. 29, 2016

(54) APPARATUS AND METHOD FOR ENCODING CONSTANT AMPLITUDE IN CODE DIVISION MULTIPLEXING COMMUNICATION SYSTEM

(71) Applicant: Electronics and Telecommunications Research Institute, Daejeon (KR)

(72) Inventors: Tae Joon Park, Daejeon (KR); Hoyong Kang, Daejeon (KR); Wun-Cheol Jeong, Daejeon (KR); Chang Sub Shin, Daejeon (KR); In Hwan Lee, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 117 days.

(21) Appl. No.: 14/056,359

(22) Filed: Oct. 17, 2013

(65) Prior Publication Data

US 2014/0153587 A1    Jun. 5, 2014

(30) Foreign Application Priority Data

Dec. 3, 2012    (KR) .................... 10-2012-0139206

(51) Int. Cl.
*H04J 13/00*    (2011.01)
*H04L 1/00*    (2006.01)

(52) U.S. Cl.
CPC .............. *H04L 1/004* (2013.01); *H04L 1/0071* (2013.01)

(58) Field of Classification Search
CPC ............................ H04L 1/004; H04L 1/0071
See application file for complete search history.

(56) References Cited

U.S. PATENT DOCUMENTS

| 7,280,468 | B2 | 10/2007 | Kang et al. | |
|---|---|---|---|---|
| 7,934,243 | B2 * | 4/2011 | Song et al. | 725/116 |
| 8,416,841 | B1 * | 4/2013 | Tarn et al. | 375/224 |
| 2003/0023929 | A1 * | 1/2003 | Kajita | 714/781 |
| 2010/0322289 | A1 * | 12/2010 | Park et al. | 375/146 |

FOREIGN PATENT DOCUMENTS

KR    10-0488431    5/2005
KR    10-2010-0135660    12/2010

* cited by examiner

*Primary Examiner* — Mark Rinehart
*Assistant Examiner* — Gbemileke Onamuti
(74) *Attorney, Agent, or Firm* — Nelson Mullins Riley & Scarborough LLP

(57) ABSTRACT

A method and apparatus for encoding a constant amplitude that is applied to a code division multiplexing communication system are provided. By dividing a data bit into a block unit, the receiving side can easily determine an error, and by reducing power consumption in outdoor wide area communication using a bit string of a small length in a basic unit of an input frame, efficiency can be improved, and thus a physical layer of a ubiquitous sensor network can be optimized.

10 Claims, 3 Drawing Sheets

APPARATUS AND METHOD FOR ENCODING CONSTANT AMPLITUDE IN CODE DIVISION MULTIPLEXING COMMUNICATION SYSTEM

CROSS-REFERENCE TO RELATED APPLICATION

This application claims priority to and the benefit of Korean Patent Application No. 10-2012-0139206 filed in the Korean Intellectual Property Office on Dec. 3, 2012, the entire contents of which are incorporated herein by reference.

BACKGROUND OF THE INVENTION (a) Field of the Invention

The present invention relates to a method and apparatus for encoding a constant amplitude of a transmitting signal in a code division multiplexing communication system.

(b) Description of the Related Art

In a code division multiplexing (CDM) communication system, a constant amplitude encoding apparatus that adjusts a signal of a multilevel that is formed by adding several orthogonal codes to a constant amplitude having a constant amplitude may be used.

In such a constant amplitude encoding apparatus, technology that can lower power consumption and that can secure tenacity against interference through a serial/parallel converter and a parity bit was suggested, but it was technology that modulates and demodulates data to transmit data of a binary orthogonal code of a constant amplitude.

Further, technology (Korean Patent Laid-Open Publication No. 10-2010-0135660) that can obtain 3/4 transmission efficiency of a diffused signal by adding surplus information for converting a constant amplitude was suggested, but it has a drawback of being technology for enhancing only transmission efficiency due to multiplexing.

SUMMARY OF THE INVENTION

The present invention has been made in an effort to provide an apparatus and method for encoding a constant amplitude having advantages of optimizing a physical layer of an ubiquitous sensor network (USN) by easily performing 9/16 code rate matching and enhancing reliability for restoration of a continuous error and retransmission efficiency.

An exemplary embodiment of the present invention provides a constant amplitude encoding apparatus that is applied to a code division multiplexing communication system. The constant amplitude encoding apparatus includes: an input frame generation module that divides a data bit string into a predetermined length and that generates a cyclic redundancy check bit of the divided data bit string and that adds the cyclic redundancy check bit to the divided data bit string to generate an input frame; a 1/N conversion module that forms the input frame into a plurality of blocks according to a predetermined block code rate; an interleaving module that converts the plurality of blocks to a matrix by filling in one direction of a horizontal direction and a vertical direction and that reads out the converted matrix in a direction different from the filled direction of a horizontal direction and a vertical direction to output the converted matrix to a series of bit strings; a 9/16 turbo product code module that outputs an encoded result by adding an additional bit to an output of the interleaving module; and a constant amplitude multiplexing module that performs a constant amplitude multiplexing process on an output of the 9/16 turbo product code module.

The input frame generation module may divide the data bit string into a 32 bit-512 bit length and add the cyclic redundancy check bit to the divided data bit string in order to make a length of the divided data bit string into a multiple of 9.

The 1/N conversion module may form the input frame into a block according to a block code rate in which the number of the plurality of blocks is 9.

The interleaving module may convert the 9 blocks to 9×N matrixes by filling in a horizontal direction and output a bit string of a 9 bit length by reading out the 9×N matrix in a vertical direction.

The 9/16 turbo product code module may convert the output of the interleaving module to a 3×3 matrix and output an encoded result of a 4×4 matrix by adding an additional bit to a row and a column of the 3×3 matrix.

The constant amplitude encoding apparatus may further include a pilot addition module that inserts a pilot of 9 bits into a result that is output from the constant amplitude multiplexing module.

Another embodiment of the present invention provides a method of encoding a constant amplitude that is applied to a code division multiplexing communication system. The method includes: dividing a data bit string into a predetermined length, generating a cyclic redundancy check bit of the divided data bit string, and generating an input frame by adding the cyclic redundancy check bit to the divided data bit string; forming the input frame into a plurality of blocks according to a predetermined block code rate; converting the plurality of blocks to a matrix by filling in one direction of a horizontal direction and a vertical direction and outputting the converted matrix to a series of bit strings by reading out in a direction different from the filled direction of a horizontal direction and a vertical direction; outputting an encoded result by adding an additional bit to the output series of bit strings; and performing a constant amplitude multiplexing process on the encoded result.

The generating of an input frame may include dividing the data bit string into a 32 bit-512 bit length and adding the cyclic redundancy check bit to the divided data bit string in order to make a length of the divided data bit string into a multiple of 9.

The forming of the input frame into a plurality of blocks may include forming an input frame into a block according to a block code rate in which the number of the plurality of blocks is 9.

The outputting of the converted matrix to a series of bit strings may include converting the 9 blocks to 9×N matrixes by filling in the 9 blocks in a horizontal direction and outputting a bit string of a 9 bit length by reading out the 9×N matrix in a vertical direction.

The outputting of an encoded result may include converting the output series of bit strings to a 3×3 matrix and outputting an encoded result of a 4×4 matrix by adding an additional bit to a row and a column of the 3×3 matrix.

The method may further include inserting a 9 bit pilot into the constant amplitude multiplexing processed result.

DETAILED DESCRIPTION OF THE EMBODIMENTS

Figure 1:
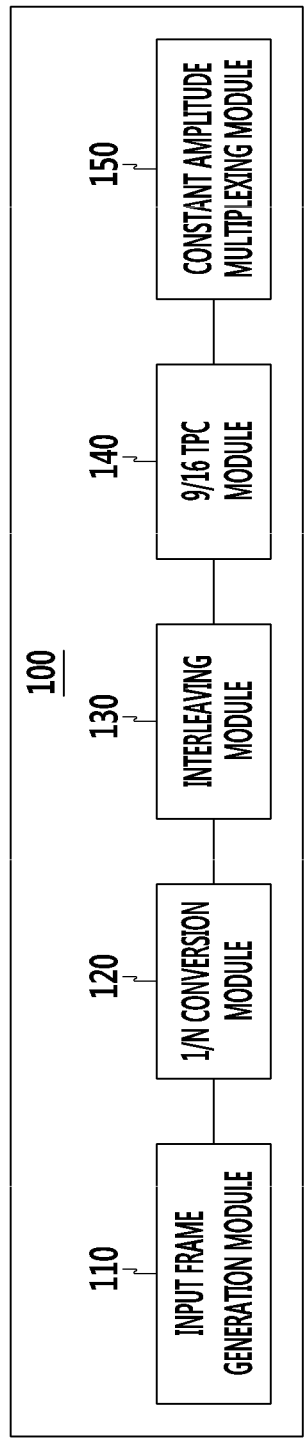
FIG. 1 is a block diagram illustrating a constant amplitude encoding apparatus according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 is a block diagram illustrating a constant amplitude encoding apparatus according to an exemplary embodiment of the present invention.

Referring to FIG. 1, a constant amplitude encoding apparatus 100 in a code division multiplexing communication system includes an input frame generation module 110, a 1/N conversion module 120, an interleaving module 130, a 9/16 turbo product code (hereinafter referred to as "TPC") module 140, and a constant amplitude multiplexing module 150.

The input frame generation module 110 divides a data bit string to be transmitted into a predetermined length, generates a cyclic redundancy check (hereinafter referred to as a "CRC") bit of a data bit to transmit, and adds a CRC bit to a data bit string to be transmitted, thereby generating an input frame.

The 1/N conversion module 120 forms an input frame into a plurality of blocks according to a predetermined block code rate. In this case, a priority of a data rate, a power consumption amount, or a transmission success rate is determined according to a characteristic of a communication service or a request of a network, and a block code rate is determined according to the determined priority.

The interleaving module 130 performs a function of transmitting data by randomly distributing a bit in which an error has occurred so that a burst error of a bit does not occur in a receiving terminal. According to an exemplary embodiment of the present invention, a block interleaving technique that converts a plurality of blocks, which are a result in which an input frame is formed into a block, to a matrix by filling in a horizontal direction and that outputs the converted matrix to a series of bit strings by reading out in a vertical direction may be suggested.

The 9/16 TPC module 140 outputs an encoded result by adding an additional bit to an output of the interleaving module 130, and the constant amplitude multiplexing module 150 performs a constant amplitude multiplexing process on the output of the 9/16 TPC module 140.

Thereafter, a pilot addition module inserts a pilot of 9 bits to a result that is output from the constant amplitude encoding apparatus 100 and transmits a frame.

Hereinafter, operation of the constant amplitude encoding apparatus 100 that is shown in FIG. 1 will be described with reference to FIGS. 2 and 3.

Figure 2:
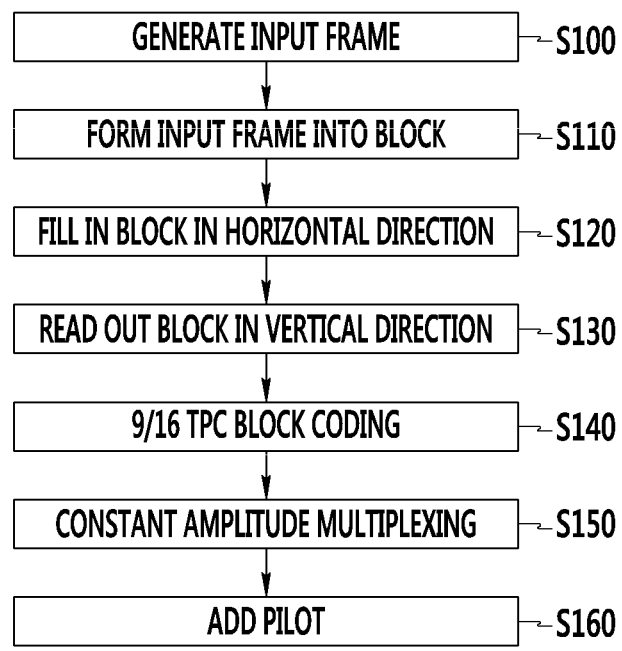
FIG. 2 is a flowchart illustrating an operation process of a constant amplitude encoding apparatus according to an exemplary embodiment of the present invention.

FIG. 2 is a flowchart illustrating an operation process of a constant amplitude encoding apparatus according to an exemplary embodiment of the present invention.

Referring to FIG. 2, the input frame generation module 110 divides a data bit string to be transmitted into a 128 bit unit, generates a data bit string of the divided 128 bit unit into CRC of 7 bits, and generates an input frame of 135 bits (data 128 bits+CRC 7 bits) (S100).

In this case, in order to successfully perform communication in a poor communication environment such as low power outdoor wide area communication, a data bit string to be transmitted is divided and used in a 128 bit (16 bytes) unit, and a length of a divided bit string can be adjusted according to a communication environment.

Further, in order to make 128 bits into a multiple of 9, a CRC bit of 7 bits is added to the 128 bits, and this is because a basic process unit in the 9/16 TPC module 140 to be performed later is 9 bits. Therefore, a length of a CRC bit may be adjusted according to a length into which a data bit string is divided.

Thereafter, the 1/N conversion module 120 forms an input frame of 135 bits into 9 blocks in a 15 bit unit (15×9=135) (S110). As described above, by forming an input frame in a block, an encoding operation is performed later in a block unit, and error determination at the receiving side may also be performed in a block unit and thus retransmission can be reduced.

Figure 3:
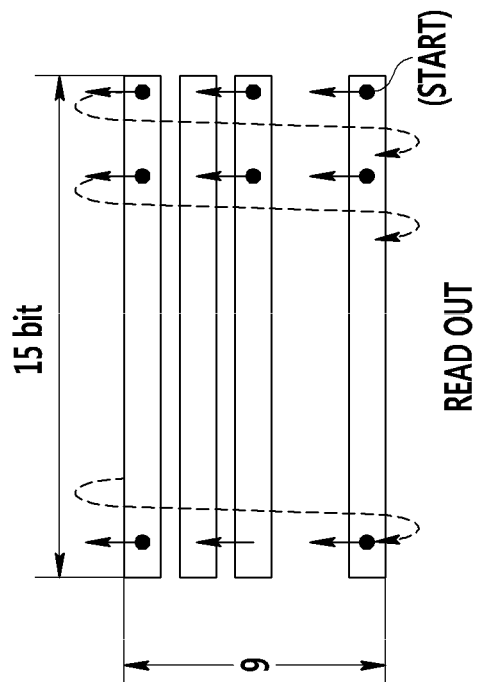
FIG. 3 is a diagram illustrating operation of an interleaving module according to an exemplary embodiment of the present invention.
Figure 3:
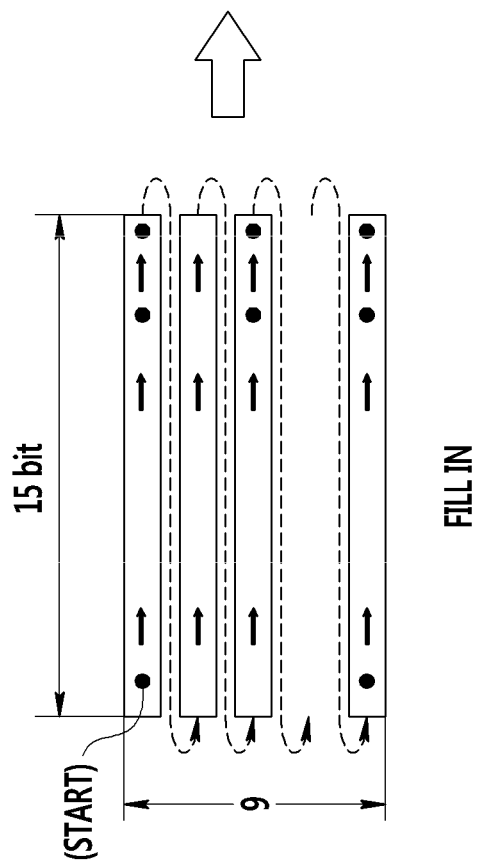

FIG. 3 is a diagram illustrating operation of an interleaving module according to an exemplary embodiment of the present invention.

Referring to FIG. 3, the interleaving module 130 fills in a total of 9 rows with a method of first filling in 1 block of 15 bits in a horizontal direction ("fill in" step) and filling in a next block by changing a row (S120). Input frames that are sequentially stacked in a block unit in this way become 9×15 matrixes.

The interleaving module 130 reads out an element (1 bit) in each row in a vertical upper direction from a last bit ((9, 15) element of the 9×15 matrix) of the input frame ("read out" step) (S130). That is, as a result that has been read out of a matrix in a vertical direction, the interleaving module 130 reads out and outputs a total of 15 bit strings of 9 bits in each column.

In this case, unlike an exemplary embodiment of the present invention, by filling in each block in a vertical direction, 15×9 matrixes are formed, and by reading out each block in a horizontal direction, a total of 15 bit strings of 9 bits in each line may be read out.

In this way, in the interleaving module 130, by converting a block of 15 bits to a bit string of 9 bits, 9/16 code rate matching of the 9/16 TPC module 140 can be easily performed, and simultaneously tenacity against a burst error may be provided.

Referring again to FIG. 2, the 9/16 TPC module 140 forms a bit string of 9 bits that are output from the interleaving module 130 into a 3×3 matrix. In this case, several methods of forming a bit string of 9 bits into a 3×3 matrix may exist. For example, a bit string of 9 bits may be formed in a matrix in a 3 bit unit in order that is input to the 9/16 TPC module 140, and according to an exemplary embodiment of the present invention, by filling in a row of a matrix in a 3 bit unit in an input order, a bit string of 9 bits may be converted to 3×3 matrixes with a method of positioning first 3 input bits at an uppermost row, positioning next 3 input bits at a lowermost row, and finally positioning 3 input bits at an intermediate row.

In this case, an input bit string may be filled in a column of a matrix, a filling order may be changed, and such contents may be variously selected as needed.

Thereafter, the 9/16 TPC module 140 outputs a 4×4 matrix by adding a bit to a row and a column of the 3×3 matrix (S140), and the constant amplitude multiplexing module 150 performs a constant amplitude multiplexing process of the 4×4 matrix that the 9/16 TPC module 140 outputs (S150).

Thereafter, a pilot is added and transmitted to a frame in which a constant amplitude multiplexing process is terminated (S160). In this case, the pilot is added to easily perform synchronization restoration of a received signal and to prevent error diffusion.

As described above, a constant amplitude encoding apparatus according to an exemplary embodiment of the present invention can enable the receiving side to easily perform error determination by dividing a data bit into a block unit and forms a bit string of a small length in a basic unit of an input frame, and thus by reducing power consumption in outdoor wide area communication, efficiency can be enhanced.

Further, a constant amplitude encoding apparatus according to an exemplary embodiment of the present invention includes an interleaving module that can provide reliability for restoration of a continuous error and include a module that inserts a pilot that can enable easy performance of synchronization restoration of a received signal into a frame having passed through a constant amplitude encoding apparatus.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A constant amplitude encoding apparatus that is applied to a code division multiplexing communication system comprising:
    the constant amplitude encoding apparatus configured to:
    divide, by an input frame generation module, a data bit string into a predetermined length and generate a cyclic redundancy check bit of the divided data bit string and add the cyclic redundancy check bit to the divided data bit string to generate an input frame;
    form, by a 1/N conversion module, the input frame into a plurality of blocks according to a predetermined block code rate;
    convert, by an interleaving module, the plurality of blocks to a matrix by filling in one direction of a horizontal direction and a vertical direction and read out the converted matrix in a direction different from the filled direction of a horizontal direction and a vertical direction to output the converted matrix to a series of bit strings;
    output, by a 9/16 turbo product code module, an encoded result by adding an additional bit to the output of the interleaving module;
    perform, by a constant amplitude multiplexing module, a constant amplitude multiplexing process on the output of the 9/16 turbo product code module; and
    divide the data bit string into a 32 bit-512 bit length and add the cyclic redundancy check bit to the divided data bit string in order to make a length of the divided data bit string into a multiple of 9; and
    a receiving terminal configured to receive data transmitted by the constant amplitude encoding apparatus.

2. The constant amplitude encoding apparatus of claim 1, further configured to form the input frame into a block according to a block code rate in which the number of the plurality of blocks is 9.

3. The constant amplitude encoding apparatus of claim 2, further configured to convert the 9 blocks to 9×N matrixes by filling in a horizontal direction and outputs a bit string of a 9 bit length by reading out the 9×N matrix in a vertical direction.

4. The constant amplitude encoding apparatus of claim 1, further configured to convert the output of the interleaving module to 3×3 matrix and outputs an encoded result of 4×4 matrix by adding an additional bit to a row and a column of the 3×3 matrix.

5. The constant amplitude encoding apparatus of claim 1, further configured to insert a pilot of 9 bits into a result that is output from the constant amplitude multiplexing module.

6. A method of encoding a constant amplitude that is applied to a code division multiplexing communication system, the method comprising:
    dividing a data bit string into a predetermined length, generating a cyclic redundancy check bit of the divided data bit string, and generating an input frame by adding the cyclic redundancy check bit to the divided data bit string,
    wherein the generating of the input frame comprises dividing the data bit string into a 32 bit-512 bit length and adding the cyclic redundancy check bit to the divided data bit string in order to make a length of the divided data bit string into a multiple of 9;
    forming the input frame into a plurality of blocks according to a predetermined block code rate;
    converting the plurality of blocks to a matrix by filling in one direction of a horizontal direction and a vertical direction and outputting the converted matrix to a series of bit strings by reading out in a direction different from the filled direction of a horizontal direction and a vertical direction;
    outputting an encoded result by adding an additional bit to the output series of bit strings; and
    performing a constant amplitude multiplexing process on the encoded result.

7. The method of claim 6, wherein the forming of the input frame into a plurality of blocks comprises forming an input frame into a block according to a block code rate in which the number of the plurality of blocks is 9.

8. The method of claim 7, wherein the outputting of the converted matrix to a series of bit strings comprises converting the 9 blocks to 9×N matrixes by filling in a horizontal direction and outputting a bit string of a 9 bit length by reading out the 9×N matrix in a vertical direction.

9. The method of claim 6, wherein the outputting of an encoded result comprises converting the output series of bit string to a 3×3 matrix and outputting an encoded result of a 4×4 matrix by adding an additional bit to a row and a column of the 3×3 matrix.

10. The method of claim 6, further comprising inserting a pilot of 9 bits into the constant amplitude multiplexing processed result.

* * * * *